United States Patent [19]

Wittkopp et al.

[11] Patent Number: 4,939,962
[45] Date of Patent: Jul. 10, 1990

[54] METHOD AND APPARATUS FOR INFLUENCING THE MOTION OF A MOVABLE MEMBER

[75] Inventors: Helmut Wittkopp, Erkelenz; Gerhardt Kluge, Ubach-Palenberg; Hartwig Klosterhalfen, Dueren all of Fed. Rep. of Germany

[73] Assignee: Wilhelm Hegenscheidt Gesellschaft mbH, Erkelenz, Fed. Rep. of Germany

[21] Appl. No.: 349,924

[22] Filed: May 9, 1989

Related U.S. Application Data

[63] Continuation of Ser. No. 137,175, Dec. 23, 1987, abandoned.

[30] Foreign Application Priority Data

Dec. 24, 1986 [EP] European Pat. Off. ............ 86118060

[51] Int. Cl.$^5$ ................................................. B23B 3/00
[52] U.S. Cl. ........................................ 82/1.11; 82/105; 82/117
[58] Field of Search ................ 82/1.11, 118, 117, 104, 82/105, ; 51/165, 165.74, 172

[56] References Cited

U.S. PATENT DOCUMENTS

| 4,399,724 | 8/1983 | Dombrowski | 82/4 E |
| 4,569,115 | 2/1986 | Unno et al. | 82/1.4 |
| 4,583,433 | 4/1986 | Nozawa et al. | 82/2 B |
| 4,667,546 | 5/1987 | Dombrowski et al. | |
| 4,693,146 | 9/1987 | Dombrowski et al. | |
| 4,821,460 | 4/1989 | Wegmann | 51/165.92 |

Primary Examiner—Frederick R. Schmidt
Assistant Examiner—Lawrence Cruz
Attorney, Agent, or Firm—W. G. Fasse; D. H. Kane, Jr.

[57] ABSTRACT

In connection with machine tools it is frequently necessary to directly couple the motion sequence of a tool carrier and thus of the tool carried by the tool carrier, to the r.p.m. of a work piece, in order to perform certain motion sequences for each revolution of the work piece. In connection with machine tools in which the r.p.m. of the work piece depends on the work piece diameter, for example, in underfloor wheel set turning machines or turning machines, the r.p.m. is not known. Additionally, the unknown r.p.m. changes during the work piece machining. In order to achieve a synchronization in spite of the changing unknown r.p.m., the time necessary for performing one revolution of the work piece is measured and the time measurement is converted into a control signal for influencing the motion of the movable member such as the tool carrier in such a way that the motion of the tool carrier is influenced as a function of the measured time duration. The time measurement is repeated for each revolution of a substantial proportion of the total time needed for the machining of a work piece.

8 Claims, 5 Drawing Sheets

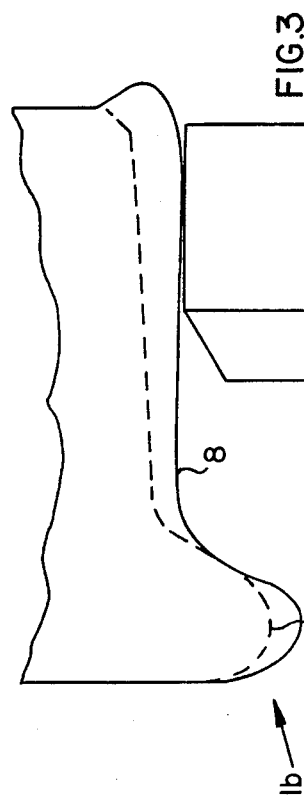
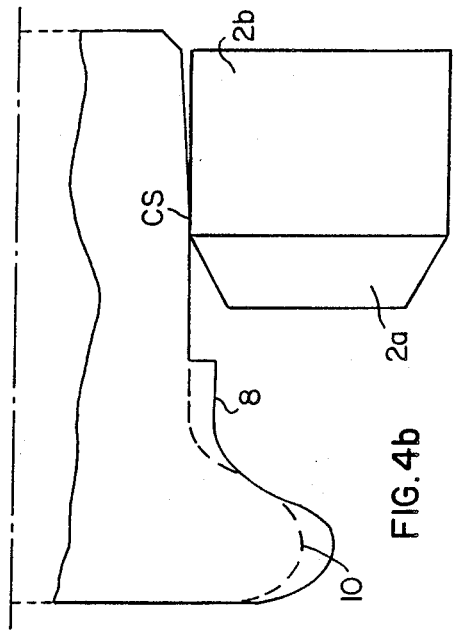
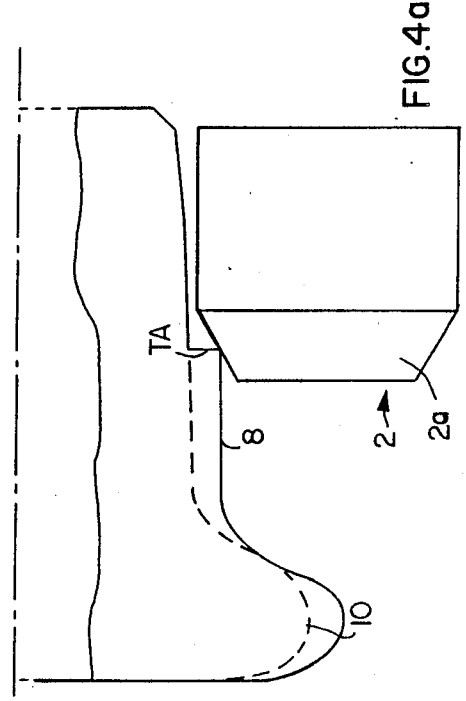

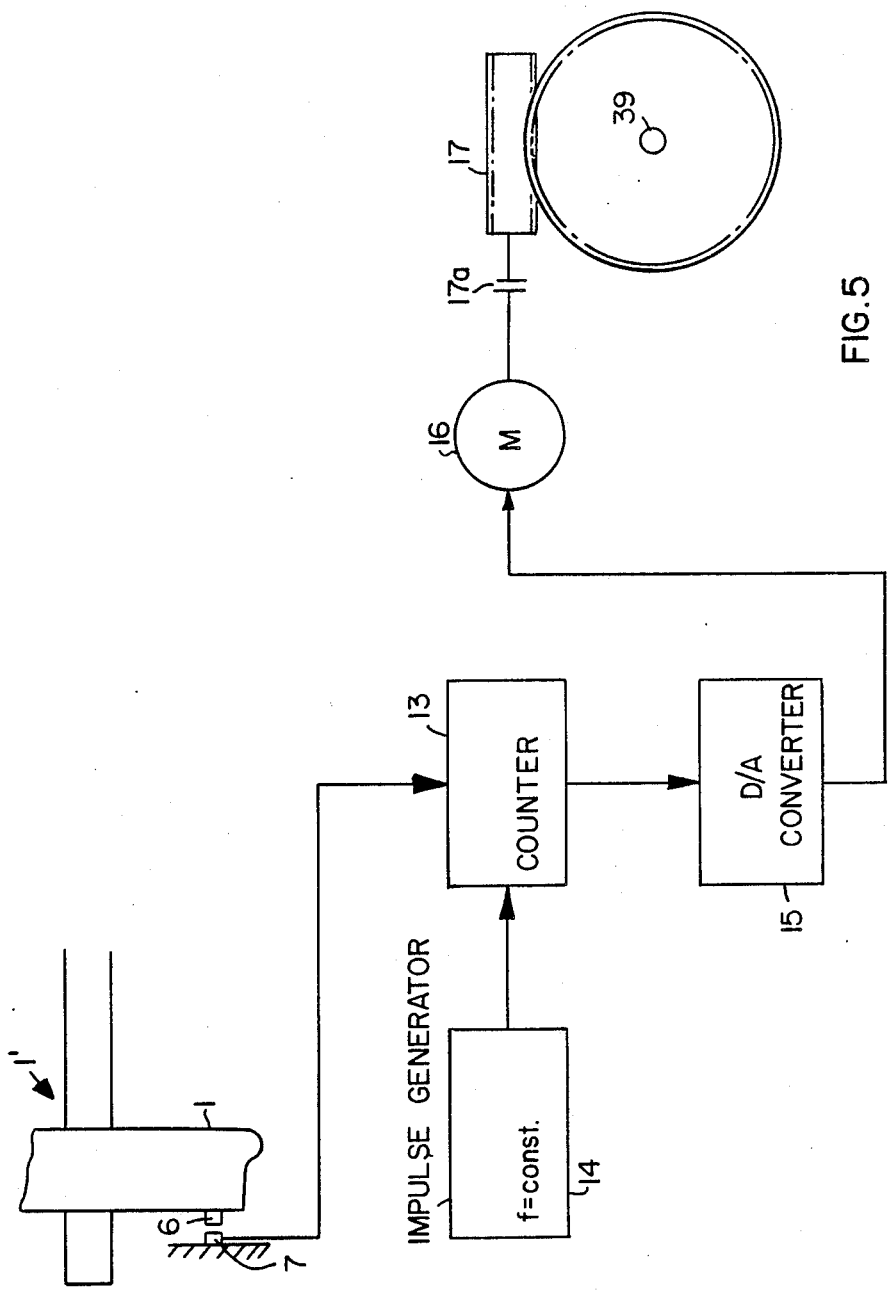

METHOD AND APPARATUS FOR INFLUENCING THE MOTION OF A MOVABLE MEMBER

This application is a continuation, of application Ser. No. 07/137,175, filed Dec. 23, 1987 now abandoned.

FIELD OF THE INVENTION

The invention relates to a method and apparatus for influencing the motion of a movable member, for example, the motion of a tool carrier in a machine tool in response to a specific requirement. Such requirements occur, for example, in machine tools for the turning of wheel sets, especially rail wheel sets and in machine tools for turning and smooth rolling of wheel set axles. In such machines the r.p.m. of the work pieces depends on the diameter of the work piece.

DESCRIPTION OF THE PRIOR ART

Machines of the above type encounter the problem that generally the r.p.m. of the work piece is unknown, although, due to the special construction of the work piece drive, the circumferential speed of the work piece and thus generally also the cutting speed during the machining are known.

German Patent Publication (DE-AS) 2,421,653 discloses a machine of the type in which a feed advance value of the tool per one revolution of the work piece is obtained by means of measuring a work piece diameter. The resulting value is used for varying the control value for the feed advance speed. Such varying is accomplished with the aid of feed advance speed adjustment members. Such an apparatus makes it possible to adjust the tool advance value as a function of the displacement of the work piece for each work piece revolution. Prior to said apparatus of German Patent Publication (DE-AS) 2,421,653 the control was made in accordance with a displacement per time function, namely in response to a speed function.

However, as the machining of a work piece proceeds, the work piece diameter varies and thus also the r.p.m. of the work piece, whereby the originally adjusted feed advance speed is not precise enough anymore. In accordances with the teaching of German Patent Publication (DE-AS) 2,421,653, it is not possible to generally synchronize certain movement functions in a predetermined manner with the r.p.m. of the work piece, including the situation where the r.p.m. of the work piece varies during the machining operation.

However, it is generally known, for example from the European Patent Publication 197,172, to provide devices and methods for synchronizing the motion of a movable member of a machine tool, for example, the turning tool or a slide carrying the turning tool, with the r.p.m. of the work piece. In the devices of European Patent Publication 197,172 it is, however, required that the r.p.m. of the work piece is known. However, exactly that is not the case in connection with machines of the type described in the introductory portion hereof.

OBJECTS OF THE INVENTION

In view of the foregoing it is the aim of the invention to achieve the following objects singly or in combination:

to provide a method for the influencing the motion of a movable member in response to a desired function to thereby make it possible to synchronize the motion of at least one movable member in the above mentioned machines, for example of a tool or a tool carrier, with the r.p.m. of the work piece;

to provide an apparatus for performing a method of the type just described;

to provide the mentioned synchronization even if the work piece r.p.m. depends from the work piece diameter and hence varies during the machining of the work piece diameter; and to measure the time needed for one r.p.m. of the work piece and to use the measured result for said influencing.

SUMMARY OF THE INVENTION

The above objects have been achieved according to the invention by a method in which during most of the time for machining a work piece the time needed for one revolution of the work piece is measured and then the measured result is used as a reference value for influencing the motion of at least one movable member, especially a tool carrier. The apparatus for performing the present method comprises means for measuring the time needed for performing one revolution of the work piece. These means provide a time representing output signal which is supplied to at least one apparatus influencing the motion of at least one movable member in such a way that the motion of said movable member will be influenced as a function of the ascertained time needed for each revolution of the work piece. Due to the measuring of the time needed for one revolution of the work piece, one obtains a directly measured value which can be supplied to a control device without calculating any intermediate values or results. Preferably, the time measurement is performed continuously as long as the machining operation continues or at least for a substantial time proportion needed for the machining operation. For example, if the feed advance speed of a tool is to be synchronized with the rotation of the work piece, it is now possible with the measured time value to directly control the respective adjustment means, in closed loop fashion, in such a way that within the measured time the required displacement of the tool to a desired position is assured.

The invention now makes it possible to apply an oscillating movement to the tool for the purpose of chip breaking, as described in the above mentioned European Patent Publication 197,172, also in such machines in which the r.p.m. of the work piece depends on the work piece diameter, for example, in underfloor wheel set turning machines or lathes for wheel sets. Thus, the application of a controlled, enforced chip breaking is now not limited any more to machines in which the work piece must be supported between two turning centers and driven by a clamping chuck with a known r.p.m. Another advantage of the invention is seen in that the continuous measurement of the time requirement for each revolution of the work piece enables a rapid adaptation of the feed advance to variations of the work piece r.p.m. Such r.p.m. variations are, for example, typical in under floor wheel set turning machines or lathes in which the wheel set is driven through friction rollers. Thus, the invention is applicable also to such underfloor wheel set turning machines. It is even possible to use the devices described in European Patent Publication 197,172 for performing the present method. However, it is necessary to provide for an input of the signals representing the information regarding the time measurement or regarding the work piece r.p.m.

The above mentioned means for measuring the time needed for each revolution of the work piece in the apparatus according to the invention provide a control signal that is supplied to the means which influence the motion of the movable member as a function of the measured time needed for each revolution of the work piece. If necessary, means are provided for properly processing the signal representing the time measurement, for passing the processed signal to suitable means for the synchronization of the respective member as a function of time representing signal. Thus, as the time measurement signal changes, for example, because the diameter of the work piece became smaller, the influence on the movable member is changed accordingly. The signal processing means may provide a suitable direct interface between the time measuring means according to the invention and the devices according to the above mentioned European Patent Publication 197,172. Thus, it is, for example, possible to provide the measured time needed for each revolution of the work piece in the form of an analog output signal and to control with this analog signal the r.p.m. of an electrical motor. For example, the signal may be an output voltage which rises when the measured time becomes shorter. The electric motor may, for example, drive a worm gear for adapting the r.p.m., whereby the output shaft of the worm gear would correspond to the shaft 39 in FIG. 6 of European Patent Publication 197,172. For example, an underfloor wheel set turning machine carries the same tools as are described in said European Patent Publication. Therefore, the same control means and control signals can be used for enforcing a chip breakage. For the special situation in which chip breakage is enforced by a motion of the tool which is synchronized with the r.p.m. of the work piece, it is possible to at least partially use the devices described in European Patent Publication 197,172 when the time needed for each work piece revolution is continuously measured. Contrary thereto, an estimate of the time needed for a work piece revolution based on a previous work piece diameter determination, as suggested in German Patent Publication 2,421,653, does not make it possible to use the devices according to the European patent Publication 197,172 for the present purposes.

According to an embodiment of the invention, at least one impulse generator having a constant pulse frequency is connected with at least one counter which counts the number of pulses that are received between the beginning and the end of one revolution of the work piece. The counter is connected for cooperation with evaluating devices, or rather with the above mentioned signal processing circuit means which in turn are connected to at least one device for influencing the movement of a movable device. It is possible to measure the time duration for one work piece revolution by means of a counter which counts the pulses of constant frequency coming from the impulse generator and which works together with a device for sensing the beginning and end of one work piece revolution. The impulse generator divides the time duration for one work piece revolution into small time intervals. An especially accurate time measurement is possible by selecting a high pulse frequency, whereby the high precision measurement enforces a synchronization between a controlled movable member and another movable member where it is necessary to achieve a motion that repeats itself periodically within the time span of one revolution as a function of this time span. This feature facilitates the synchronization with another moving component, whenever a periodically recurring motion is to be achieved with the period of one work piece revolution and as a function of this period. Therefore, it is possible, e.g. when enforcing the breaking of chips, to generate a certain required number of tool half oscillations during one revolution of the work piece.

The above mentioned sensor for the beginning and end of one work piece revolution may preferably be a stationary proximity sensor or switch that operates without contact with the rotating work piece. Such a sensor or switch may, for example, be activated by a magnetic marker carried by the work piece. Especially in connection with underfloor wheel set turning machines this type of sensor is a very simple means for the intended purpose of determining the beginning and end of one revolution of a wheel of a wheel set.

BRIEF DESCRIPTION OF THE DRAWINGS

In order that the invention may be clearly understood, it will now be described, by way of example, with reference to the accompanying drawings, wherein:

FIG. 3 shows, on an enlarged scale, the detail X of FIG. 2;

FIG. 4a is a view similar to that of FIG. 3, however, showing the work piece or wheel in a change-over phase during a reprofiling operation;

FIG. 4b is a view similar to that of FIG. 3, however, showing the work piece after a change-over phase during a reprofiling operation;

FIG. 5 is a schematic block diagram of the apparatus according to the invention;

DETAILED DESCRIPTION OF PREFERRED EXAMPLE EMBODIMENTS AND OF THE BEST MODE OF THE INVENTION

Figure 2:
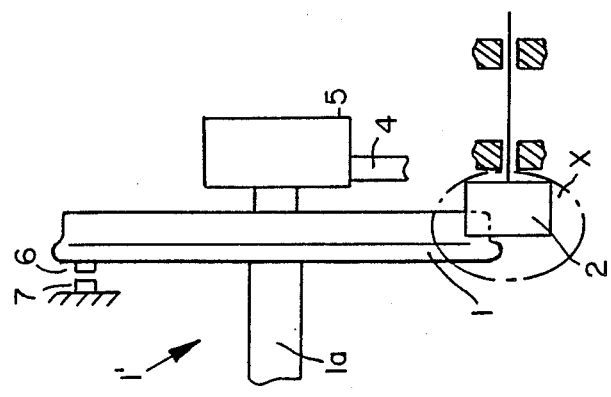
FIG. 2 is a view in the direction of the arrow A in FIG. 1.
Figure 1:
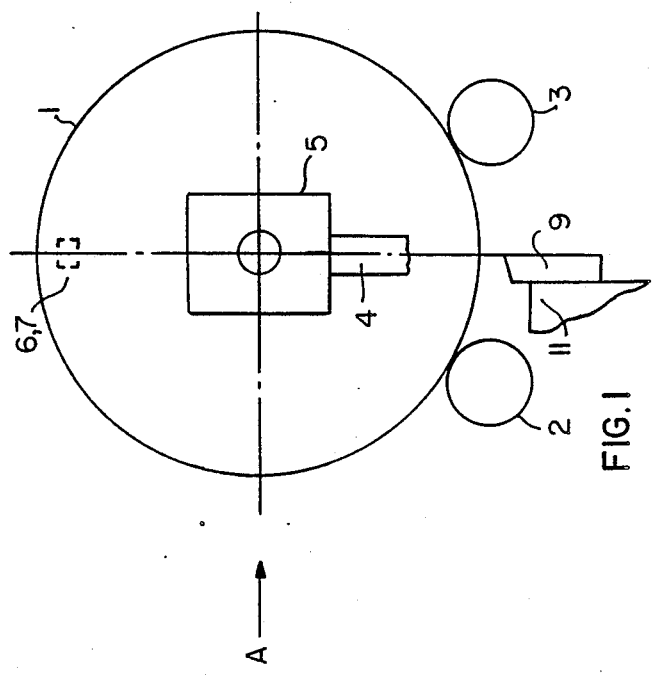
FIG. 1 shows a schematic view of a wheel set as viewed in the direction of the rotational axis of the wheel set and also illustrating drive rollers and turning tools as well as axle box supporting arrangement.

FIGS. 1 and 2 show a wheel set 1' carrying two wheels 1 on an axle 1a driven by friction drive rollers 2 and 3. The wheel set is mounted in a so-called underfloor wheel set turning machine. Since the arrangement is mirror-symmetrical, only one side is shown as seen in FIG. 2. The axle 1a is mounted in a bearing box 5 supported by mounting members 4 which are part of the underfloor wheel set turning machine.

The friction drive rollers 2 and 3 are pressed against the circumferential surface of the wheel 1 with a force sufficient to provide the necessary friction to rotate the wheels with a sufficient torque moment for the machining operation. The construction of such underfloor wheel set turning machines or machine tools and the arrangement, pressing, and driving of the drive rollers 2 and 3 are part of the prior art and hence the drive means of the rollers and the pressing means for these rollers are not shown in detail. However, FIG. 3 shows an enlarged illustration of the friction drive roller 2 pressed against the worn circumferential wheel surface 8 shown by a full line in FIG. 3. The dashed line 10 represents the corrected circumferential wheel surface. The friction drive roller 2 has a conical portion 2a which is facing the wheel rim 1b and which is necessary for providing a continuous transition between a corrected wheel circumferential surface portion and a not yet corrected wheel circumferential surface portion as the reprofiling proceeds. The surface of the conical portion 2d is in contact with the wheel circumferential surface. The transition area is shown at TA in FIG. 4a. The r.p.m. of the drive roller 2 is constant. Therefore, the circumferential speed at the point of contact in the zone TA between the drive roller 2 and the circumferential surface of the wheel becomes smaller as the wheel diameter decreases, or larger as the wheel diameter increases, whereby the time needed for one revolution of the wheel increases. As the machining proceeds, this situation changes again. As the machining proceeds, the point of contact TA leaves the conical portion 2a and the cylindrical portion 2b of the drive roller 2 contacts the corrected surface at CS as shown in FIG. 4b. As a result, the circumferential speed increases again so that the time needed for one revolution of the wheel becomes shorter. These facts are known in the art.

In the light of the above it is clear that in underfloor wheel set turning machines of the type described, the r.p.m. of the work piece varies although the r.p.m. of the friction drive rollers remains constant. Additionally, the r.p.m. of the work piece varies from work piece to work piece, depending on the diameter of the work piece. While it is known that the work piece r.p.m. varies, the r.p.m. itself is not known. The system described in the above mentioned German Patent Publication 2,421,653 does not solve this problem because during the machining the diameter of the work piece also changes. The new diameter of the work piece in such machines is also unknown and is ascertained only after a material removing machining operation. It has been found that the prior art method for determining an approximate work piece or wheel diameter is insufficient for the purposes of the invention. According to such purposes, it is necessary that certain motion sequences of the machine tool machining the work piece are ascertained precisely so that the tool motion can be respectively adjusted to the time needed for one revolution of the work piece, that is, for synchronizing the tool motion with the work piece motion.

A synchronizing is described in the above mentioned European Patent Publication 197,172, however, only where the time needed for one revolution of a work piece is known. This type of conventional synchronization cannot be used, for example in an underfloor wheel set turning machine because the time needed for one work piece revolution is not known in such a machine.

For synchronizing movable elements and driven elements such as a rotating work piece with a machining tool, it is necessary to ascertain the time needed for one revolution of the work piece because between the r.p.m. of the drive rollers 2 and 3 on the one hand, and the r.p.m. of the work piece driven by these rollers 2 and 3, there is no known relationship.

As shown in FIG. 5 in a simple embodiment according to the invention an impulse generator 14 having a known and constant frequency functions as a clock signal generator and supplies its output pulses to the input of a counter 13 and the counter 13 counts the pulses. Each pulse defines a small time unit which becomes the smaller the higher the frequency.

The counter 13 starts counting at the beginning of a revolution of the wheel 1 and it stops counting at the end of one revolution. For this purpose a switch 7 is operated by the rotation of the wheel 1. The switch 7 may be a sensor, for example, a proximity sensor which is activated by an "initiator" 6, for example in the form of a small permanent magnet attached to the wheel in a proper position for cooperation with the sensor or switch 7. An impulse from the switch 7 supplied to the counter 13 starts a pulse sequence and the next impulse from the switch 7 stops the first counting sequence while initiating the next counting sequence. The train of pulses from the impulse generator 14 between two pulses from the sensor 7 define the time duration for one revolution of the wheel 1. When the counter 13 receives an impulse from the sensor 7 after a certain number of pulses have been counted, that number of pulses is supplied to a signal processing device 15, such as a digital to analog converter, which may provide an analogous control voltage to a motor 16 driving a worm gear 17 preferably through a clutch 17a for driving a shaft 39, for example, of a tool carrier. The counter 13 in FIG. 5 keeps actually continuously counting while the impulses from the sensor 7 divide the counter pulses counted by the counter into a number of pulse trains, whereby each pulse train represents the time duration for one revolution of the wheel 1. As a result of the just described operation of the circuit according to FIG. 5, the motor 16 is synchronized with the rotation of the wheel 1. Accordingly, the worm gear 17 is also synchronized with the rotation of the wheel 1. Thus, it is possible to influence a tool carrier 11 shown in FIG. 1 and carrying a tool 9 in such a way that the motion of the tool carrier is also synchronized with the r.p.m. of the shaft 39 in accordance with any desired synchronization relationship. For example, the influencing or control of the tool carrier may be such that the feed advance speed of the tool 9 corresponds to a desired function which in turn is based on the time needed by the wheel 1 to make one revolution. In other words, the tool advances for a defined distance for each revolution of the wheel 1. Additional motions of the tool carrier 11 and its tool 9 may also be controlled in response to the output signal from the signal processing device 15. For example, in addition to influencing the feed advance motion, it is possible to also control an oscillating motion of the tool as is described in the above European Patent Publication 197,172. For this purpose it would be sufficient to connect the present shaft 39 shown in FIG. 5 with the switching drum of FIG. 6 of said European Patent Publication. With the connection of the present worm gear 17 to the shaft 39 of the switching drum in FIG. 6 of said European Patent Publication, the present teaching may be performed by the apparatus disclosed in the European Patent Publication.

In the circuit of FIG. 5 it must be assured that a lower r.p.m. of the wheel 1 results in a lower r.p.m. of the motor 16 and vice versa. However, a lower wheel r.p.m. means that more pulses are counted because there is more time available for the pulse counting at a lower r.p.m. than at a higher r.p.m. More counted pulses result in a higher output voltage of the device 15. Fewer pulses counted result in a lower output voltage of the device 15. Thus, the output voltage of the device 15 is inversely proportional to the r.p.m. of the wheel 1. Accordingly, the circuit 15 will include means for properly controlling the motor 16, for example, through an analog divider or the like and including an amplifier.

Figure 6:
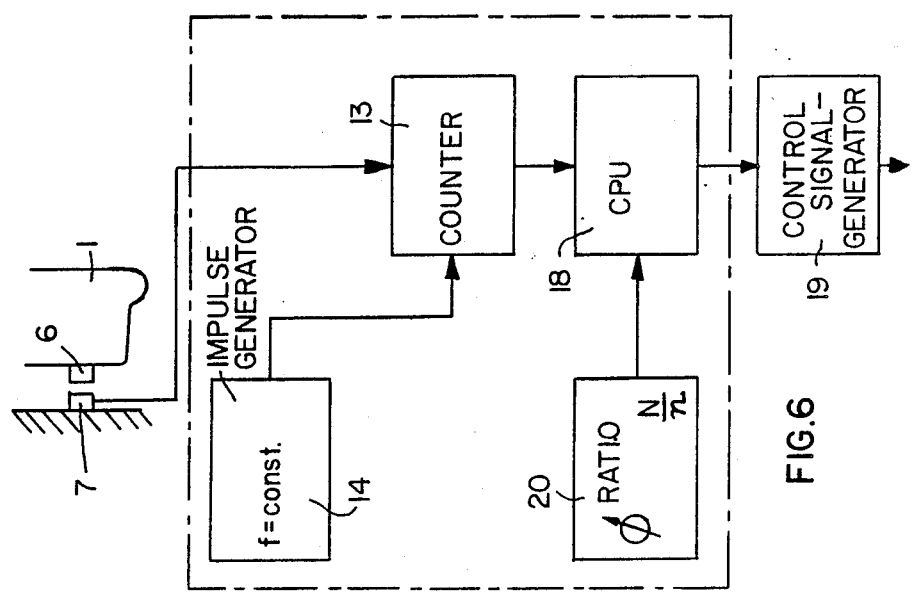
FIG. 6 is a schematic block diagram of a modified embodiment of the apparatus according to the invention.

In FIG. 6 the output of the counter 13 is supplied to a central processing unit including a computer 18 rather than to a device as shown at 15 in FIG. 5. The central processing unit 18 is also connected to an input circuit 20 for providing a manually adjustable input signal representing the number N of times a certain operation shall take place during the time T required for one revolution of a work piece. The symbol for one or more revolutions shall be n. For example, the number N may represent the number of oscillations of the tool 9 and/or the passing of the tool 9 through a determined feed advance which shall take place during the time T of one revolution of the wheel 1. The computer 18 processes the signal count and the ratio signal to provide an output signal to an input of a control signal generator 19 which in turn then provides the required control signal to the drive means. For example, the output signal of the control signal generator 19 may be used in the circuit of FIG. 18 of the above mentioned European Patent Publication 197,172, whereby the present signal generator 19 would replace the frequency generator 134 and the switching gear 48. Otherwise, the arrangement would remain the same.

Figure 7:
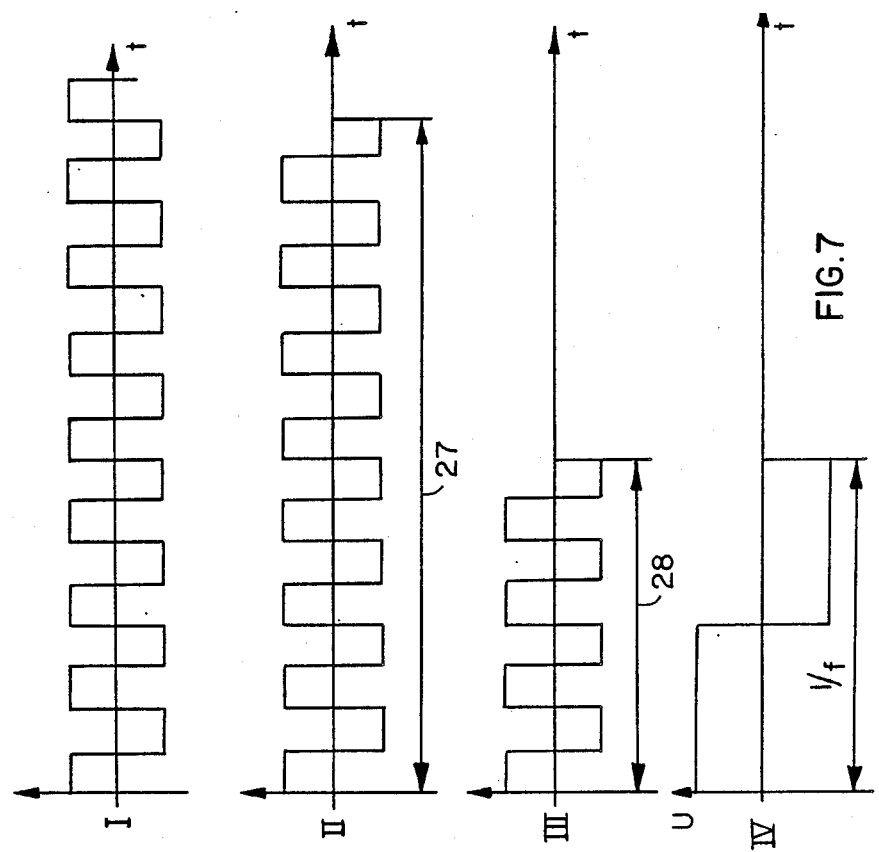
FIG. 7 is an impulse diagram for explaining the operation of the present apparatus.

FIG. 7 shows time diagrams, whereby the pulse sequence I represents the continuous output of the impulse generator 14. The pulse train II represents the number of pulses between the beginning and the end of one revolution of the wheel 1. The time duration for this pulse train T is shown at 27. The diagram III with the duration 28 shows the number of pulses representing the time span of one period of an event, such as one oscillation. The calculation is as follows: a given ration N/n is entered through the circuit 20 into the CPU 18, wherein N=number of events, for example, number of oscillations, n=number of revolutions of a work piece during which a number of events shall take place. The CPU 18 divides the number of pulses shown in diagram II within the duration 27 by the ration N/n. From the CPU 18 the control signal generator 19 receives the dimension of the distance 28 in suitable form, and from this information the control signal generator forms a periodical output signal which is represented in diagram IV. The diagrams of FIG. 7 show signals of rectangular shape. However, it will be possible to generate and use signals having any suitable waveform.

Figure 8:
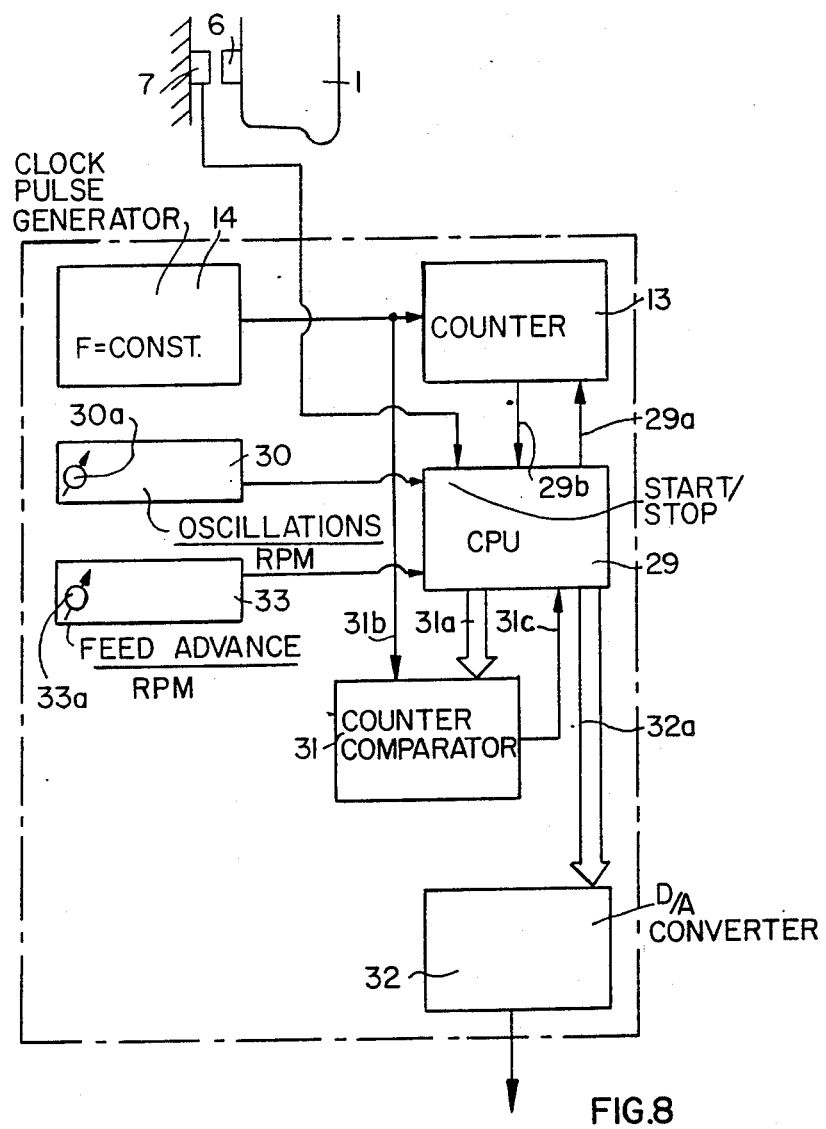
FIG. 8 shows a block diagram of a further embodiment according to the invention.

FIG. 8 shows a modified embodiment which comprises substantially the same components as in FIG. 5 plus a central processing unit 29, a first ratio input 30 providing a signal representing the number of tool oscillations for each revolution of the wheel 1, a second ratio input 33 representing the feed advance for each revolution of the wheel 1. The input unit 30 can be adjusted manually by an adjustment member 30a. The input unit 33 is adjustable by a manual input member 33a. The embodiment of FIG. 8 further includes a second counter 31 and a signal processing circuit primarily a digital-to-analog converter 32 to provide the proper output control signal, for example, for controlling the feed advance and oscillation of a tool.

The system of FIG. 8 operates as follows. The clock pulse generator 14 continuously produces a pulse sequence of constant frequency and counter 13 counts these pulses continuously. The beginning and end of one revolution of the wheel 1 is again sensed by the sensor 7 and the respective impulses are supplied to a start/stop input of the central processing unit 29 which provides time marker signals on conductors 29a and 29b for the beginning and end of a count retrieval by the central processing unit 29 from the counter 13 in response to the signals received at the start/stop input of the CPU 29 from the sensor 7. This count retrieval does not interrupt the continuous counting of the counter 13. This operation of the central processing unit is repeated for the entire duration of a machining operation. If a predetermined number of oscillations of a tool or tool carrier are to be performed synchronously for each revolution of the work piece or wheel 1, the input unit 30 provides a respective signal to a corresponding input of the central processing unit 29 after manual adjustment of the unit 30 by the adjustment member 30a. The central processing unit 29 calculates from the number of input oscillations the number of half oscillations and the central processing unit 18 divides the number of pulses in a pulse train retrieved from the counter 13 by the number of half oscillations provided through the input unit 30. The result of this division is supplied as a rated value to the counter 31 which also performs a comparing function. For this purpose an input of the counter comparator 31 is connected to receive the pulses from the clock pulse generator 14. The counter 31 keeps counting until the number of pulses received on the input 31b corresponds to the rated value. If that is the case, a signal on the conductor 31c is supplied by the counter comparator 31 to the central processing unit 29 which in turn supplies a signal to the digital-to-analog converter 32 through a databus 32a. The digital-to-analog converter 32 produces an analog voltage which is either positive or negative, depending on a previous determination. The counter 31 keeps receiving pulses from the generator 14 and also keeps comparing a number of received pulses with the previously restored rated value. If again coincidence is achieved, a respective signal is supplied to the CPU 29 which again supplies a signal to D/A converter 32 to provide an analog voltage which is, for example, positive when the preceding voltage was negative relative to a reference voltage. This cycling is repeated until the wheel 1 has completed one full revolution. Further, the entire sequence is also repeated when the wheel makes the next revolution. Should the r.p.m. of the wheel change, the CPU 29 ascertains such a change and provides a new rated value to the counter and comparator 31.

If the tool is not supposed to oscillate, the input member 30 is adjusted to zero. As a result, the counter 31 also does not function in this mode of operation. In that case the unit 32 provides an analog output voltage having a constant polarity rather than an alternately negative and positive output voltage.

The further input unit 33 can control the feed advance of a tool as described above with reference to FIG. 6.

With regard to the circuit blocks in FIGS. 5, 6, and 8, the following should be noted. The impulse generator 14 is a conventional clock signal generator forming part of a so-called "motherboard" "KAT 286" made by Kontron. The counter 13 is a conventional impulse counter implemented, for example, on a counter card model "appli-data PA 170" made by Applied Data Co. Block 15 is a conventional digital-to-analog converter. The central processing unit 18 is part of the above mentioned "motherboard" and further includes a Kontron memory card KAT/PRE, a power supply 135W, a monitor and a keyboard model XYCOM 4106 made by XYCOM, a real time multi-task operating system Kontron RT/iX, an MS-DOS made by Microsoft Inc., and a color graphic adapter made by IBM. The control signal generator 19 is implemented by a counter card model "apply-data PA 170" and by an analog-to-digital converter and digital-to-analog converter on card model "apply-data PA 310". Input circuit 20 is a conventional potentiometer for providing the above explained input signal representing the ratio N/n. All the components of FIG. 8 are also conventional components.

Although the invention has been described with reference to specific example embodiments, it will be appreciated, that it is intended to cover all modifications and equivalents within the scope of the appended claims.

What we claim is:

1. A method for controlling the motion of a movable tool (9), in response to varying time durations for the completion of one revolution of a rotatable work piece (1), comprising the following steps:
    (a) contacting a circumferential surface of said rotatable work piece (1) with friction drive roller means (2, 3) and friction driving said rotatable work piece (1) by said friction drive roller means (2, 3), wherein the r.p.m. of said work piece changes during a machining operation on a circumferential surface of said work piece by said tool due to slipping between said friction drive roller means and said rotatable work piece, due to changes in the diameter of said friction drive roller means (2, 3), and due to changes in the diameter of said work piece when said machining operation proceeds,
    (b) measuring directly at the work piece the time duration required by said rotatable friction driven work piece for completing one revolution, and repeating said time duration measurements during at least part of said machining operation for obtaining signals representing different time durations in accordance with said r.p.m. changes,
    (c) converting said measured time duration signals into motion control signals, and
    (d) using said motion control signals for controlling the motion of said movable tool during said machining operation, whereby the motion of said movable tool is responsive to said different time durations.

2. The method of claim 1, wherein said time measuring step is performed by starting a pulse count at the beginning of a revolution of said friction driven rotatable tool and stopping said pulse count at the end of said revolution.

3. The method of claim 2, further comprising converting said pulse count into said control signal.

4. An apparatus for controlling the motion of a movable tool (9, 11) in response to varying time durations for the completion of one revolution of a rotatable work piece (1), comprising drive means including friction roller drive means (2, 3) for contacting a surface of said rotatable work piece (1) for friction driving said rotatable work piece by said friction roller drive means, wherein the r.p.m. of said work piece changes during a machining operation on a circumferential surface of said work piece by said tool due to slipping between said friction drive roller means and said rotatable work piece, due to changes in the diameter of said friction drive roller means (2, 3), and due to changes in the diameter of said work piece when said machining operation proceeds, first means (6, 7) for measuring directly at said friction driven work piece a time duration required by said rotatable friction driven work piece for completing one revolution for obtaining signals representing different time durations in accordance with said r.p.m. changes, second means (13) operatively connected to said first means for converting said time duration signals into control signals, and third means (15) receiving said control signals for controlling the motion of said movable tool (9, 11) in response to the time measured for one revolution, whereby the motion of said movable tool (9, 11) is responsive to said different time durations.

5. The apparatus of claim 4, wherein said first means for measuring a time duration comprise a clock pulse generator for generating clock pulses of constant frequency, impulse counter means connected to said clock pulse generator, and sensor means operatively arranged for providing signals signifying a beginning and an end to control the beginning and end of a counting sequence by said impulse counter means, said second means comprising signal processing means for receiving measured time representing values and for converting said time representing values into said control signals, said third means comprising motor means for driving said movable tool.

6. The apparatus of claim 5, wherein said sensor means comprise a stationary sensor arranged for cooperation with said rotatable friction driven work piece and activator means rotating with said rotatable friction driven work piece for activating said sensor means to mark a start and an end of one revolution of said rotatable friction driven work piece.

7. The apparatus of claim 6, wherein said stationary sensor is a magnetic sensor and said activator means is a magnetic marker carried by said rotatable friction driven work piece.

8. The method of claim 1, further comprising rotating said friction roller drive means with a constant r.p.m.

* * * * *

UNITED STATES PATENT AND TRADEMARK OFFICE
CERTIFICATE OF CORRECTION

PATENT NO. : 4,939,962

DATED : July 10, 1990

INVENTOR(S) : Helmut Wittkopp et al.

It is certified that error appears in the above-identified patent and that said Letters Patent is hereby corrected as shown below:

In claim 5, between lines 6 and 7, (Column 10, between lines 33 and 34) please insert:

--of one revolution of said rotatable friction driven work piece--

Signed and Sealed this

Seventeenth Day of September, 1991

Attest:

HARRY F. MANBECK, JR.

*Attesting Officer*   Commissioner of Patents and Trademarks